US012741370B2

(12) United States Patent
Tang

(10) Patent No.: US 12,741,370 B2
(45) Date of Patent: Sep. 22, 2026

(54) SPATIAL PARALLELOGRAM CONNECTING ROD STRUCTURE AND MINIATURIZED MECHANICAL ARM HAVING SAME AND APPLICATION

(71) Applicant: Beijing Precision Medtech Co., Ltd., Beijing (CN)

(72) Inventor: Yi Tang, Beijing (CN)

(73) Assignee: Beijing Precision Medtech Co., Ltd., Beijing (CN)

( * ) Notice: Subject to any disclaimer, the term of this patent is extended or adjusted under 35 U.S.C. 154(b) by 224 days.

(21) Appl. No.: 18/576,737

(22) PCT Filed: Nov. 14, 2022

(86) PCT No.: PCT/CN2022/131715
§ 371 (c)(1),
(2) Date: Nov. 20, 2024

(87) PCT Pub. No.: WO2023/093558
PCT Pub. Date: Jun. 1, 2023

(65) Prior Publication Data

US 2025/0187175 A1 Jun. 12, 2025

(30) Foreign Application Priority Data

Nov. 29, 2021 (CN) ......................... 202111427214.3
Aug. 9, 2022 (CN) ......................... 202210947412.0

(51) Int. Cl.
*B25J 9/10* (2006.01)
*B25J 9/00* (2006.01)

(52) U.S. Cl.
CPC .......... *B25J 9/1065* (2013.01); *B25J 9/0009* (2013.01)

(58) Field of Classification Search
CPC . B25J 9/0009; B25J 9/046; B25J 9/047; B25J 9/101; B25J 9/106; B25J 9/1065; B25J 9/126
See application file for complete search history.

(56) References Cited

U.S. PATENT DOCUMENTS 5,145,312 A * 9/1992 Sonoda .............. B23K 26/0884 414/744.3
2023/0166396 A1* 6/2023 Liu .......................... B25J 9/108 74/490.03

FOREIGN PATENT DOCUMENTS

CN 204525465 A 8/2015
CN 105459090 A 4/2016
(Continued)

OTHER PUBLICATIONS

Wikipedia contributors. (Oct. 31, 2021). Control theory. In Wikipedia, The Free Encyclopedia. Retrieved 22:41, Feb. 26, 2026, from https://en.wikipedia.org/w/index.php?title=Control_theory&oldid=1052863299 (Year: 2021).*
(Continued)

*Primary Examiner* — Joseph Brown
(74) *Attorney, Agent, or Firm* — Hemisphere Law, PLLC

(57) ABSTRACT

The present invention discloses a spatial parallelogram connecting rod structure and a miniaturized mechanical arm having same and application, comprising a rotating base, a triaxial mechanical arm and a spatial parallelogram connecting rod structure. An installation housing is fixed on a rotating base, and a fixed part of the rotating base is installed on a supporting apparatus of a medical device; the rotating output end of the second rotating body is provided with a turntable forearm, and an edge of the turntable forearm is hinged with a forearm oscillating bar; an output control body is provided with two hinged points which are hinged with the ends of the large arm oscillating bar and the forearm
(Continued)

oscillating bar respectively; and the output control body is fixed on a shell of a first rotating part of the triaxial mechanical arm.

9 Claims, 16 Drawing Sheets

(56) References Cited

FOREIGN PATENT DOCUMENTS

| | | | | |
|---|---|---|---|---|
| CN | 108748115 A | 11/2018 | | |
| CN | 209504119 A | 10/2019 | | |
| CN | 112405599 A | 2/2021 | | |
| CN | 113829335 | 12/2021 | | |
| CN | 115008448 | 9/2022 | | |
| JP | 2659172 | 9/1997 | | |
| WO | WO-0174548 A1 * | 10/2001 | ............. | B25J 9/046 |

OTHER PUBLICATIONS

International search report of PCT/CN2022/131715.

* cited by examiner

SPATIAL PARALLELOGRAM CONNECTING ROD STRUCTURE AND MINIATURIZED MECHANICAL ARM HAVING SAME AND APPLICATION

TECHNICAL FIELD

The present invention relates to the technical field of medical equipment, and more particularly relates to a spatial parallelogram connecting rod structure and a miniaturized mechanical arm having same and application.

BACKGROUND

Ultrasound, X-ray, computed tomography (CT), magnetic resonance imaging (MRI), digital subtraction angiography (DSA) and other medical imaging techniques are common clinical diagnostic modes and induction treatment means. Real-time medical image guidance can monitor the tumor and normal organs in real time, and adjust the surgical route and the treatment scheme according to the change of the location, size and shape of the lesion, so as to achieve the accurate diagnosis and treatment of the lesion. However, CT and MRI are limited by the space of the equipment itself, and it is difficult for clinicians to perform some operations, such as biopsy and ablation, in real time during diagnosis and treatment.

The existing surgical robots or surgical navigation and positioning systems with mechanical arms are generally common mechanical arms or industrial mechanical arms integrated with Universal Robots, KUKA and other brands, and their integrated main consoles, such as the invention patent application with patent number CN201810950031.1 and the title of a precision positioning tumor surgical robot system and a target positioning method thereof.

This surgical robot has the disadvantages of fixed operating range, large weight ratio, maintenance inconvenience, carrying inconvenience, large volume and the like, and is not suitable for some compact surgical environments. Especially in the case of medical imaging (such as CT and MRI) guidance, the existing surgical robot and the navigation and positioning system cannot enter a scanning hole of medical imaging equipment, and thus cannot perform real-time surgical operations under image guidance.

The existing surgical robot needs to move a patient in and out of the MRI scanning hole repeatedly during a surgery, thereby increasing the risk of accidents and the duration of the surgery.

Therefore, in order to make full use of the advantages of CT and MRI in imaging, there is a need for a mechanical arm capable of entering the CT and MRI scanning holes and performing diagnosis and treatment operations in time during or after the scanning.

SUMMARY

In view of this, the present invention provides a spatial parallelogram connecting rod structure and a miniaturized mechanical arm having same and application, to solve the above technical problems.

To achieve the above purpose, the present invention adopts the following technical solution:

A spatial parallelogram connecting rod structure comprises:

- an installation housing, wherein the installation housing is provided with a connecting rod moving notch; and a coaxial and non-interfering bidirectional rotating seat is fixed inside the installation housing;
- a first rotating body, wherein the first rotating body is rotatably connected to one side of the bidirectional rotating seat, and the rotating output end of the first rotating body is provided with a large arm oscillating bar extending from the connecting rod moving notch;
- a second rotating body, wherein the second rotating body is rotatably connected to the other side of the bidirectional rotating seat; the rotating output end of the second rotating body is provided with a turntable forearm, an edge of the turntable forearm is hinged with a forearm oscillating bar, and the forearm oscillating bar extends from the connecting rod moving notch;
- an output control body, wherein the output control body is provided with two hinged points which are in the same direction, not coaxial and staggered; and the two hinged points are hinged with the ends of the large arm oscillating bar and the forearm oscillating bar that extend from the installation housing respectively.

Through the above technical solution, the spatial parallelogram connecting rod structure provided by the present invention adopts a bidirectional rotating symmetrical arrangement form, which can integrate the driving force of two degrees of freedom into the installation housing, reduce the rotating counterweight of the hinged points, and realize a more accurate driving effect. The motion range of the parallelogram structure is flexible, and staggered, which enhances the stability of the structure and can realize the multi-angle and multi-directional motion drive of the output control body.

Preferably, in the above spatial parallelogram connecting rod structure, the first rotating body and the second rotating body realize input and transmission of rotating power through matching structures of motors and gear sets; central shafts of the rotating output ends of the first rotating body and the second rotating body are connected with two encoders fixed on both sides in the installation housing respectively; and the two encoders form a feedback closed loop with the two motors corresponding to both sides respectively. A closed-loop feedback circuit formed by motor drive control and the encoders can accurately control the number of rotation turns of the motors and improve the control accuracy.

Preferably, in the above spatial parallelogram connecting rod structure, both sides of the installation housing are provided with limiting grooves respectively on internal structures corresponding to the first rotating body and the second rotating body, and the first rotating body and the second rotating body are provided with limiting columns matched with the corresponding limiting grooves. The cooperation of the limiting grooves and the limiting columns can limit the rotation strokes of the first rotating body and the second rotating body.

Preferably, in the above spatial parallelogram connecting rod structure, the forearm oscillating bar is a bent rod. The forearm oscillating bar is bent, which mainly avoids the motion limitation and expands the motion range.

The present invention further provides a miniaturized mechanical arm, comprising a rotating base, a triaxial mechanical arm and the spatial parallelogram connecting rod structure; the installation housing is fixed on the rotating base, and the output control body is fixed on a shell of a first rotating part of the triaxial mechanical arm.

Through the above technical solution, the miniaturized mechanical arm provided by the present invention is driven down and the overall center of gravity is moved down, which improves the load capacity of the robot, realizes operation in a narrow space, saves more space, reduces collision and improves safety.

It should be noted that interventional surgical robot products suitable for magnetic resonance imaging (MRI) environments are very limited in the market in the present. The reason for this is multiple challenges of developing MRI-guided surgical robots. For example, the requirements for MRI bi-directional compatibility are as follows: on one hand, the electrical system of the robot shall not interfere with the MRI scanning functions nor cause image artifacts; and on the other hand, the magnetic field, the gradient field and the radio-frequency field of the MRI device shall not interfere with the normal use of the electrical system of the robot. For another example, the space limitation of MRI scanning holes is a great challenge for the electrical design of surgical robots. To meet the requirements for MRI compatibility, the layout of electronic components and the electrical shielding measures need to be considered. Therefore, the solution design of the miniaturized mechanical arm of the present invention is of great significance for the development of the interventional surgical robot products for the MRI environments.

Preferably, in the above miniaturized mechanical arm, the rotating base comprises a fixed part and a rotating part which are rotatably connected, and the rotating part is driven by the matching structures of the motors and the gear sets to rotate relative to the fixed part; a rotation stroke limiting structure is arranged between the fixed part and the rotating part; and the installation housing is fixed on the rotating part. The rotating base can realize the rotation drive to drive the spatial parallelogram connecting rod structure to rotate as a whole, and has the function of rotation limit.

Preferably, in the above miniaturized mechanical arm, the triaxial mechanical arm comprises a first rotating mechanism, a second rotating mechanism and a third rotating mechanism which are connected successively; the first rotating mechanism, the second rotating mechanism and the third rotating mechanism are all motor driven output shaft rotating structures; a shell of the first rotating mechanism is fixed with the output control body, and a rotating output shaft thereof is fixedly connected with the second rotating mechanism; a rotating output shaft of the second rotating mechanism is fixedly connected with the third rotating mechanism; and a rotating output shaft of the third rotating mechanism is a terminal working end. The sequential transfer connection of the first rotating mechanism, the second rotating mechanism and the third rotating mechanism can realize the actions of three degrees of freedom, and the drive control of 6 degrees of freedom is realized with one degree of freedom of the rotating base and two degrees of freedom of the parallelogram connecting rod structure.

Preferably, in the above miniaturized mechanical arm, a rotating plane of the first rotating mechanism is perpendicular to a rotating plane of the second rotating mechanism, and the rotating plane of the second rotating mechanism is perpendicular to a rotating plane of the third rotating mechanism. The rotating plane of the first rotating body is parallel to the rotating plane of the second rotating body, and is perpendicular to the rotating plane of the rotating base and the rotating plane of the first rotating mechanism respectively; and the rotating plane of the rotating base is perpendicular to the rotating plane of the first rotating mechanism. Through the above arrangement, the drive setting in degrees of freedom at different directions can be satisfied.

The present invention further provides an application of the above miniaturized mechanical arm, and the fixed part of the rotating base is installed on a supporting apparatus of a medical device.

Through the above technical solution, the miniaturized mechanical arm provided by the present invention is applied in a narrow space, especially a diagnosis and treatment mechanical arm in a scanning hole of medical imaging equipment, intended to solve the problems that the existing surgical robot cannot enter the scanning hole of the imaging equipment, and cannot use the image data to carry out real-time operation while scanning. Through the solution of the present disclosure, a diagnosis and treatment instrument covers a lesion area from any position and angle in real time in the scanning hole of the imaging equipment, conducts diagnosis and treatment operation, and maximizes the utilization of the space in the scanning hole.

It should be noted that the supporting apparatus of the medical device mentioned in the present invention is another patent application for invention with the patent number CN202210191212.7 and the title of a supporting frame of medical equipment, and is fixed through the structure.

It can be known form the above technical solution that compared with the prior art, the present invention discloses and provides a spatial parallelogram connecting rod structure and a miniaturized mechanical arm having same and application, and has the following beneficial effects:

1. The miniaturized mechanical arm provided by the present invention is small in volume, can enter the scanning hole of the medical imaging equipment, has 6 degrees of freedom, and can satisfy basic diagnosis and treatment needs, such as puncture, biopsy, ablation, electrode implantation, etc.
2. The miniaturized mechanical arm provided by the present invention can be applied to the internal narrow spaces of all kinds of medical imaging equipment, and is combined with the diagnosis and treatment equipment to complete access operations or auxiliary tests in real time. The robot has six joint spatial degrees of freedom, is arranged in series, has the ability to work in small size and large free space, and can complete the work without affecting the work situation of existing medical device. The robot can enter the hole and operate remotely.

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Figure 1:
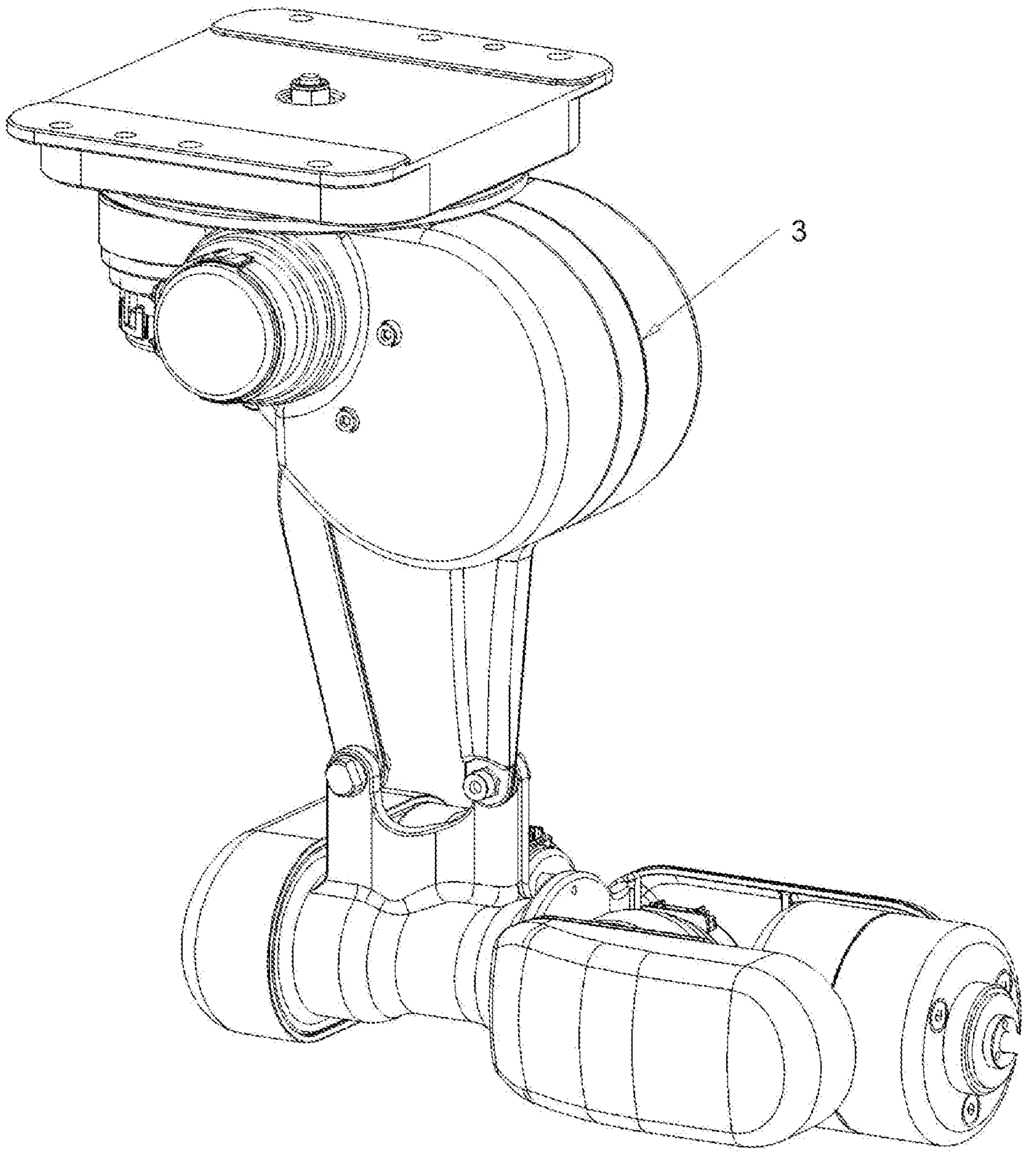
FIG. 1 is a structural schematic diagram of a miniaturized mechanical arm provided by the present invention.
Figure 2:
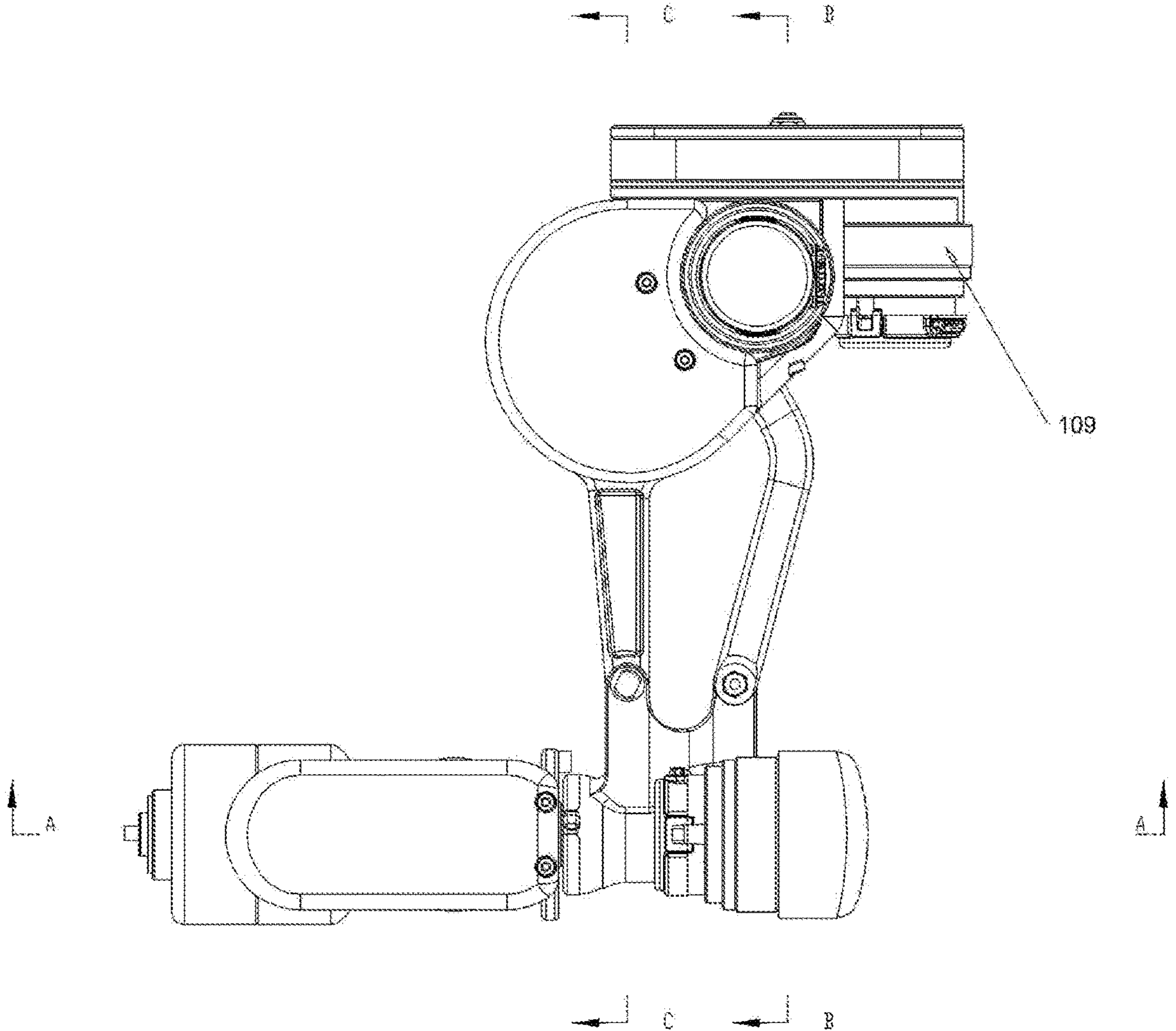
FIG. 2 is a side view of a miniaturized mechanical arm provided by the present invention.

Wherein:

1—medical device; 2—supporting apparatus; 3—spatial parallelogram connecting rod structure;

101—base; 102—locking nut; 103—first connecting shaft; 104—first bearing; 105—sliding thrust washer; 106—supporting seat; 107—first gear; 108—connecting screw; 109—first motor; 110—first spacer bush; 111—right limit; 112—left limit;

201—third motor; 202—second speed reducer; 203—second encoder; 204—fourth gear; 205—third transmission gear; 206—second duplex gear; 207—fourth transmission gear; 208—fifth gear; 209—large arm oscillating bar; 210—second supporting wallboard; 211—second shell; 212—seventh connecting screw; 213—tenth connecting screw; 214—gasket; 215—first limiting column; 216—ninth connecting screw; 217—second limiting column; 218—sixth connecting screw; 219—third spring washer; 220—third connecting shaft; 221—supporting shaft; 223—limiting pin;

301—second motor; 302—first speed reducer; 303—second gear; 304—first encoder; 305—first transmission gear; 306—first duplex gear; 307—second transmission gear; 308—third gear; 309—turntable forearm; 310—forearm oscillating bar; 311—first shell; 312—first supporting wallboard; 313—second connecting screw; 314—fourth connecting screw; 315—second spring washer; 316—second connecting screw; 317—first connecting screw; 318—first spring washer; 319—pin shaft; 320—first thrust bearing; 321—fifth connecting screw; 322—middle shell; 323—second connecting shaft; 324—eighth connecting screw; 325—limiting pin shaft; 326—first connecting pin; 327—first sliding bearing; 328—second thrust bearing; 329—second locking nut; 330—oscillating arm connecting hole; 331—third locking nut; 332—third thrust bearing; 333—second sliding bearing; 334—second connecting pin; 335—second large arm connecting hole; 336—oscillating bar connecting hole; 337—first large arm connecting hole;

401—shaft arm; 402—limiting shaft; 403—eleventh connecting screw; 404—fourth limit; 405—third limit; 406—fourth motor; 407—first speed reducer and drive transmission structure; 408—first output gear; 409—set screw; 410—fourth locking nut; 411—third spacer bush; 412—retaining ring for hole; 413—third bearing; 414—second bearing; 415—second spacer bush;

501—second supporting shaft; 502—cover plate; 503—fourth bearing; 504—fifth bearing; 505—fifth motor; 506—limiting fixed shaft; 507—second output gear; 508—shaft end retaining ring; 509—twelfth connecting screw; 510—second speed reducer and drive transmission structure;

601—supporting frame; 602—connecting block; 603—sliding block; 604—thrust bearing; 605—third speed reducer and drive transmission structure; 606—sixth motor; 607—output shaft.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 16:
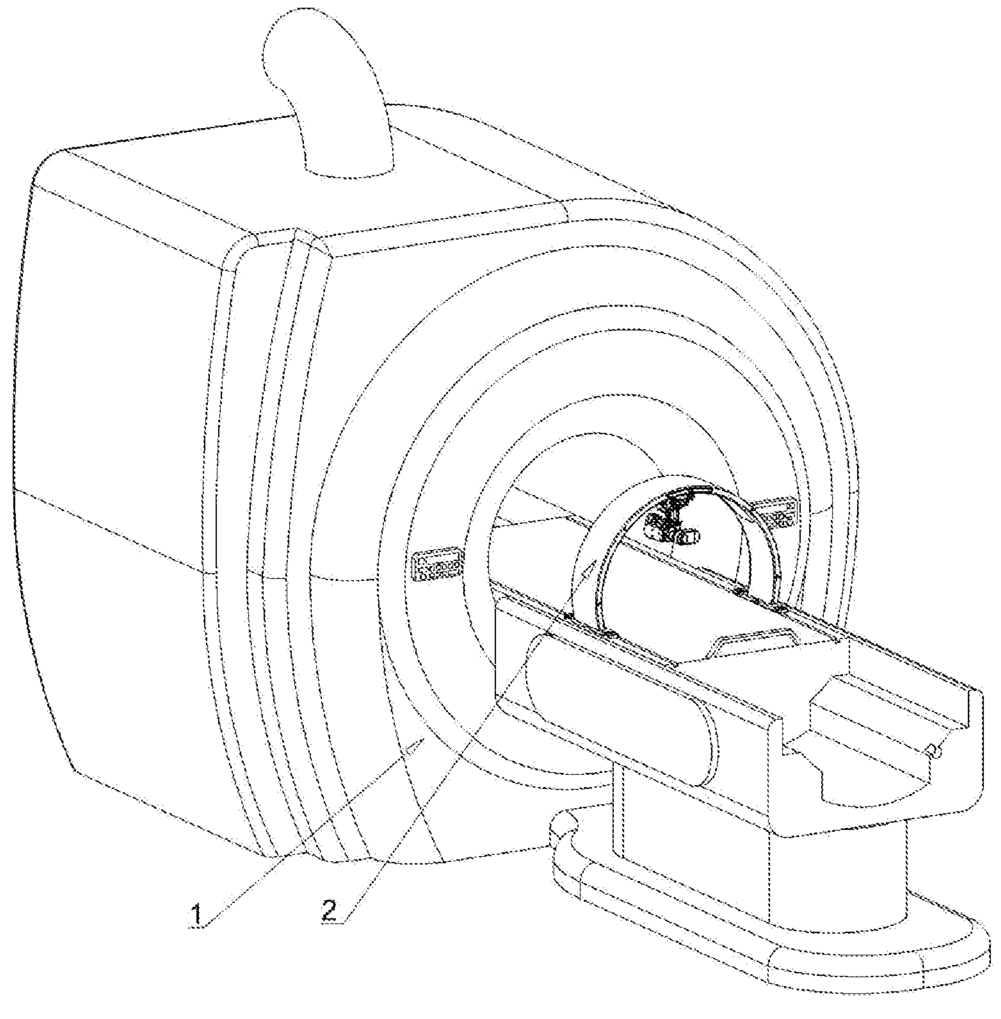
FIG. 16 is a schematic diagram of an application scenario of a miniaturized mechanical arm provided by the present invention.

By referring to FIG. 1 and FIG. 16, the present embodiment provides a miniaturized mechanical arm, comprising a rotating base, a triaxial mechanical arm and a spatial parallelogram connecting rod structure. An installation housing is fixed on a rotating base, and an output control body is fixed on a shell of a first rotating part of a triaxial mechanical arm. A fixed part of the rotating base is installed on a supporting apparatus of a medical device.

The spatial parallelogram connecting rod structure comprises: an installation housing, a first rotating body, a second rotating body and an output control body. The installation housing is provided with a connecting rod moving notch; a coaxial and non-interfering bidirectional rotating seat 300 is fixed inside the installation housing; the first rotating body is rotatably connected to one side of the bidirectional rotating seat 300, and the rotating output end of the first rotating body is provided with a large arm oscillating bar extending from the connecting rod moving notch; the second rotating body is rotatably connected to the other side of the bidirectional rotating seat 300; the rotating output end of the second rotating body is provided with a turntable forearm, an edge of the turntable forearm is hinged with a forearm oscillating bar, and the forearm oscillating bar extends from the connecting rod moving notch; the output control body is provided with two hinged points which are in the same direction, not coaxial and staggered; and the two hinged points are hinged with the ends of the large arm oscillating bar and the forearm oscillating bar that extend from the installation housing respectively.

For the specific structure of the rotating base: by referring to FIG. 1 to FIG. 2, FIG. 4 and FIG. 16, the base 101 is the main supporting structure of the robot, and also a bridge connected with the supporting apparatus 2 of the medical device 1. The bottom surface adopts a U-shaped structure to reduce the contact surface, and also has a positioning structure of square holes on both sides to ensure the installation and connection accuracy requirements.

Figure 4:
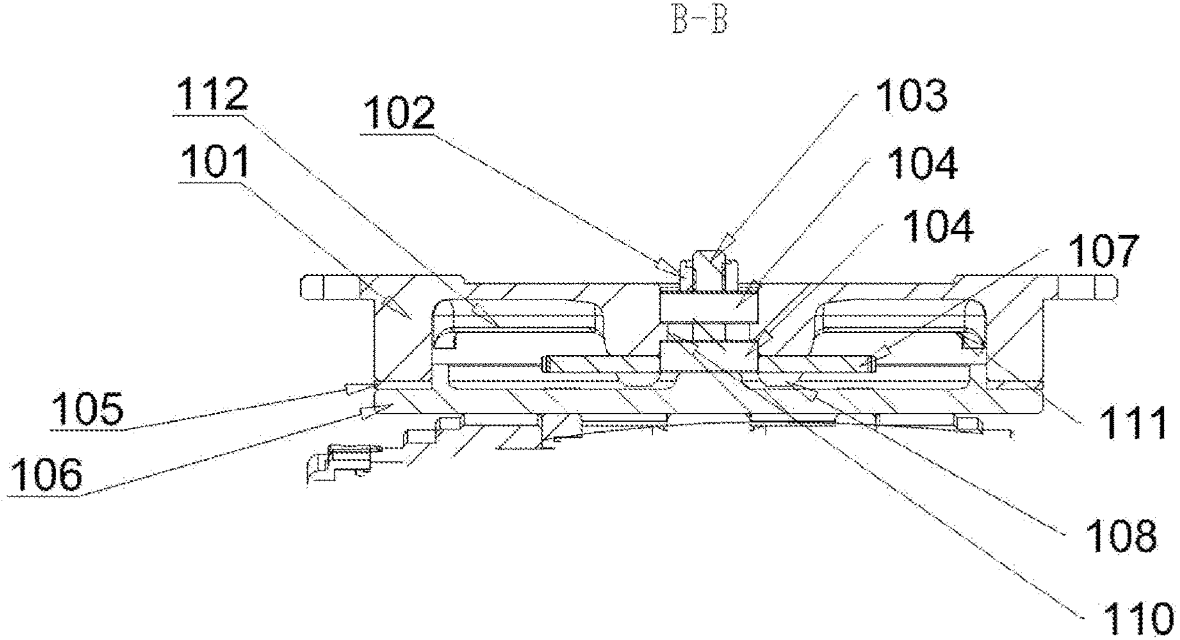
FIG. 4 is a schematic diagram of B-B in FIG. 2 provided by the present invention.
Figure 5:
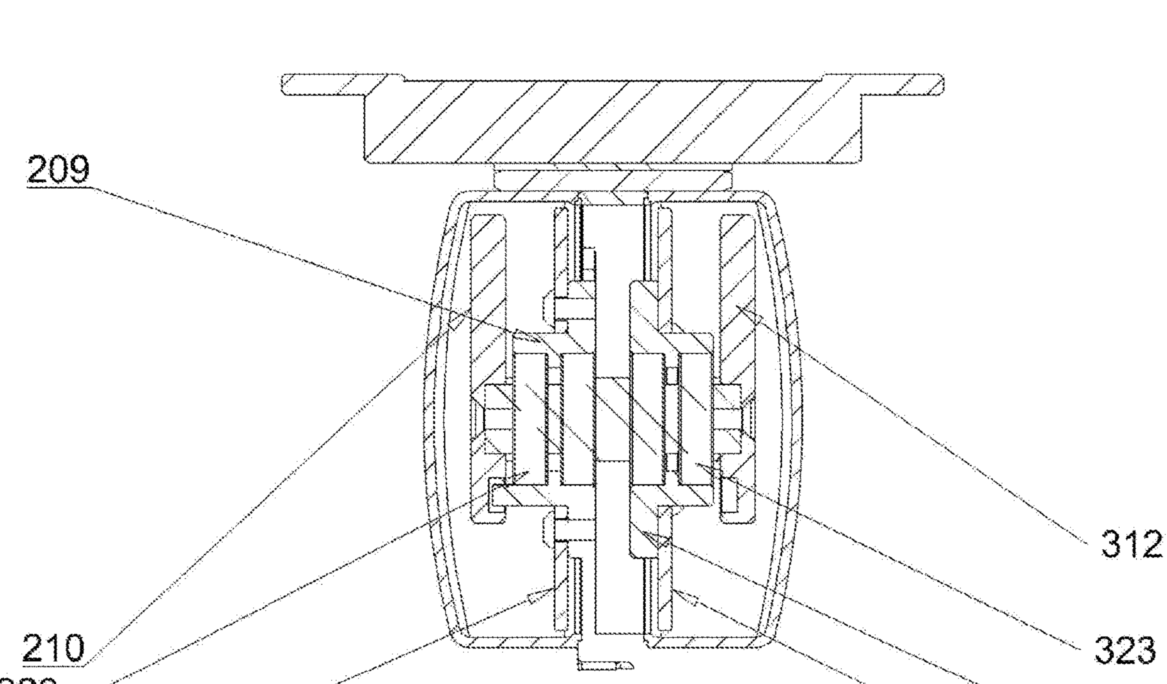
FIG. 5 is a schematic diagram of C-C in FIG. 2 provided by the present invention.

Specifically, by referring to FIG. 4, the base 101 and the supporting seat 106 are supported and connected through the first connecting shaft 103 and first bearings 104 to form a concentrically rotating matching structure. At the same time, a sliding thrust washer 105 is closely connected on the corresponding end surface between the base 101 and the supporting seat 106, which can ensure that the bearing demand of the first connecting shaft 103 and the radial force borne by the first bearings 104 are shared in eccentric load. The bottom end of the first connecting shaft 103 is fixed with the supporting seat 106, and the top end passes upward through the central hole of the base 101. The top end of the first connecting shaft 103 is connected with a first locking nut 102 of the first bearings 104, and the first connecting shaft 103 is sleeved with two first bearings 104 and a first spacer bush 110. The first spacer bush 110 is located between the two first bearings 104. The base 101 and the supporting seat 106 are installed together in a straight port to ensure the overall positioning accuracy of the robot, which can effectively reduce assembly tools and improve installation accuracy and structural strength. After the base 101 and the supporting seat 106 are installed, an installation cavity is formed therebetween. The first gear 107 is connected with the base 101 by a connecting screw 108, and the first gear 107 is located in the installation cavity. The first motor 109 is installed on the supporting seat 106 to form an overall fixed connection structure; the power is transferred to the first gear 107 through the rotation of an output shaft of the structure; and the supporting seat 106 and the overall structure of the upper robot are pushed reversely to rotate around a connecting shaft 104. A left limit 112 and a right limit 111 are downward convex structures inside the base 101, which reduces the connecting blocks, saves the internal space and provides the mechanical limit for the motion of the supporting seat 106.

By referring to FIG. 5 to FIG. 12, the installation housing is composed of a first shell 311, a second shell 211 and a middle shell 322 and is fixed by a fifth connecting screw 321.

Figure 6:
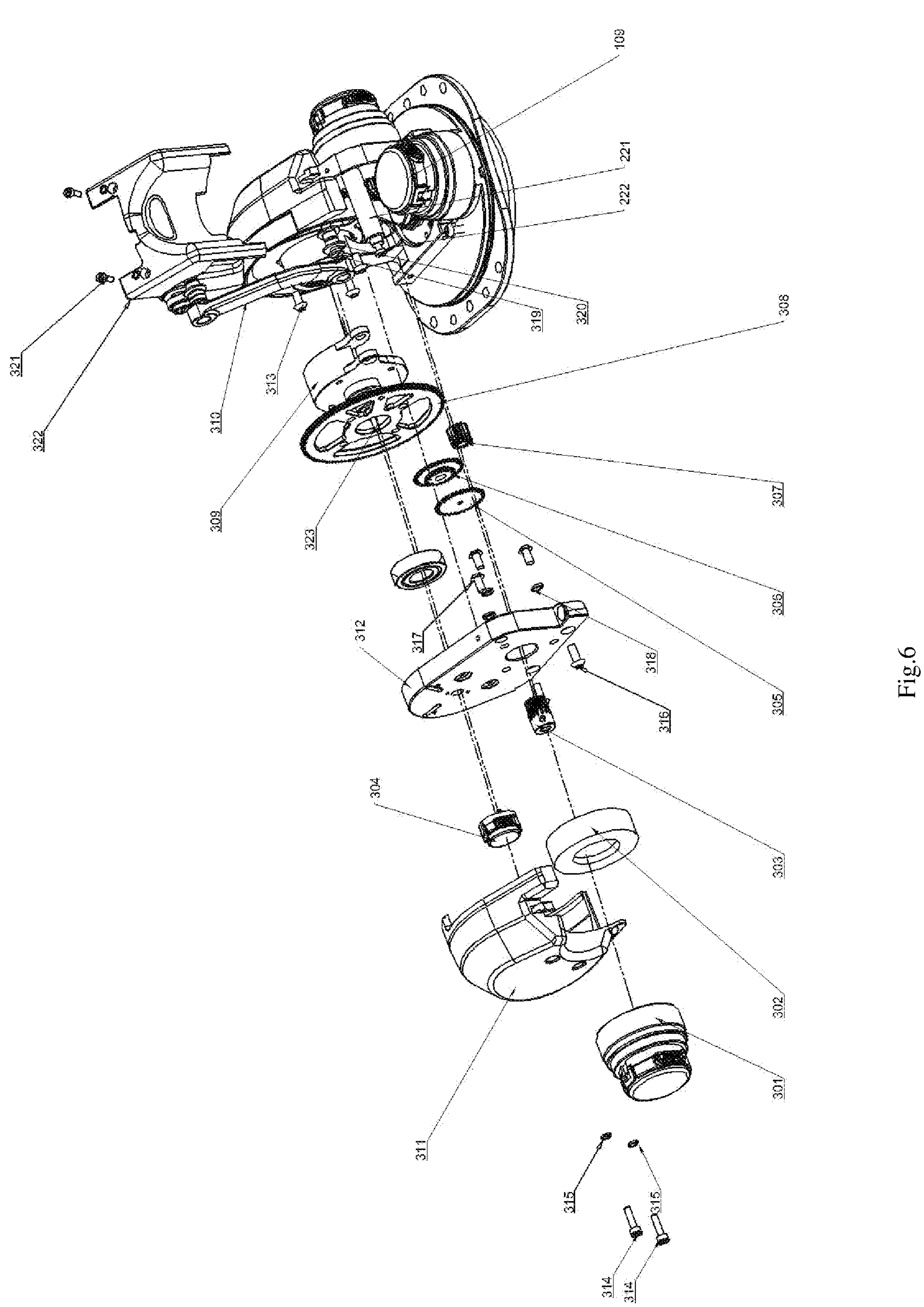
FIG. 6 is an explosive view of a second rotating body in a spatial parallelogram connecting rod structure provided by the present invention.

By referring to FIG. 6, for the specific structure of the second rotating body: a second motor 301 is coaxial with a first speed reducer 302, and the second motor 301 is connected to the first shell 311 through a fourth connecting screw 314 and a second spring washer 315. A second gear 303 and the first speed reducer 302 are tightly positioned and connected by screws, and fixedly connected with a first supporting wallboard 312 by the first connecting screw 317, the third connecting screw 316 and the first spring washer 318. The above belongs to positioning and connecting through straight ports. The second gear 303 is engaged and transmitted with a first transmission gear 305, a first duplex gear 306 and a second transmission gear 307 successively, and finally engaged with a third gear 308; the third gear 308 is fixedly connected with the turntable forearm 309 through a second connecting screw 313, and positioned through a center shaft hole; and the structure of the third gear 308 is a spoke structure, which can reduce the weight of the body and reduce the operating moment of inertia while ensuring the strength of the structure. The second connecting shaft 323 is rotationally concentric with the turntable forearm 309, and the rotating shaft body as a direct output is coaxially connected with a first encoder 304 for the double closed loop of structural signals. The limiting structure of the turntable forearm 309 is connected with a hollow region of a large arm oscillating bar 209. The forearm oscillating bar 310 and the turntable forearm 309 form hinged motion connection through a pin shaft 319 and first thrust bearings 320; the number of the first thrust bearings 320 is two; axial rotation is formed among the double thrust bearing structures, the turntable forearm 309 and the forearm oscillating bar 310, and meets the radial fixation; and the forearm oscillating bar 310 and the turntable forearm 309 form a staggered layout that is not coplanar with the large arm oscillating bar 209, which can not only enhance the spatial stability, but also form a spatial staggered cross and non-interference configuration. The bending setting of the forearm oscillating bar 310 is the same as the effect of a straight rod, and can ingeniously avoid the interference of rotating motion in a compact space. An arc angle is relevant to the diameter of a large surface of the turntable forearm 309, which needs to avoid the interference in rotation and needs to form spatial staggering with a first supporting shaft 221.

Figure 7:
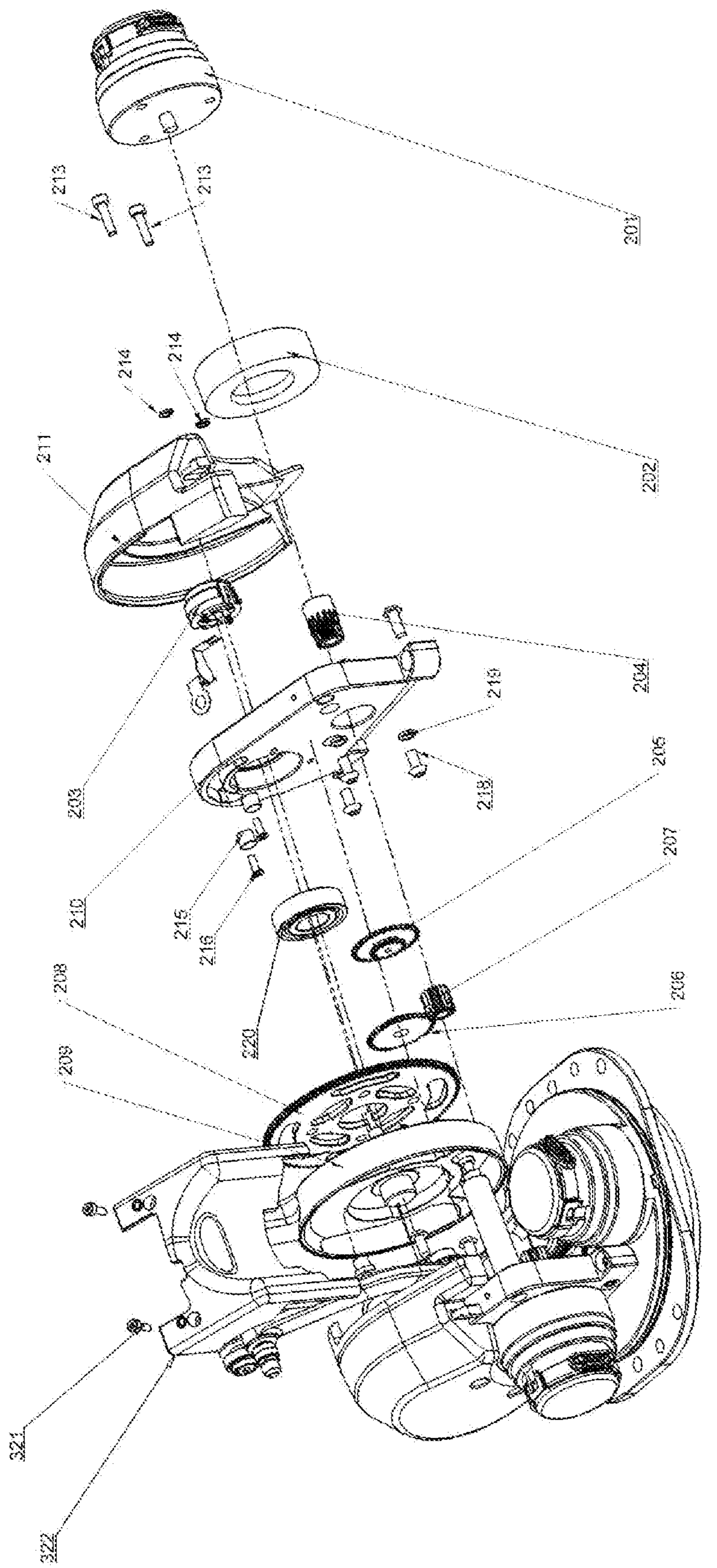
FIG. 7 is an explosive view of a first rotating body in a spatial parallelogram connecting rod structure provided by the present invention.
Figure 8:
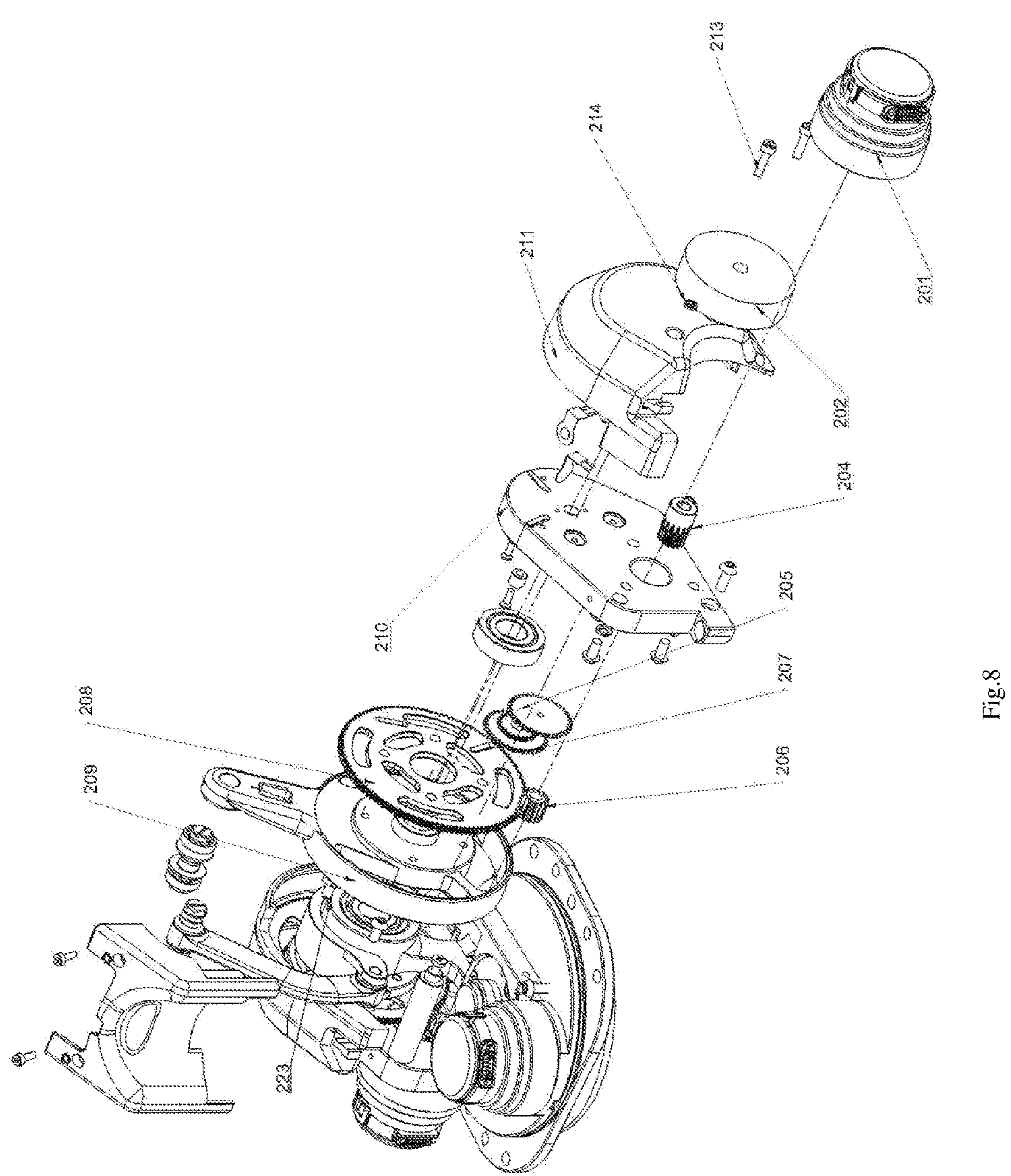
FIG. 8 is a schematic diagram of another angle in FIG. 7 provided by the present invention.
Figure 9:
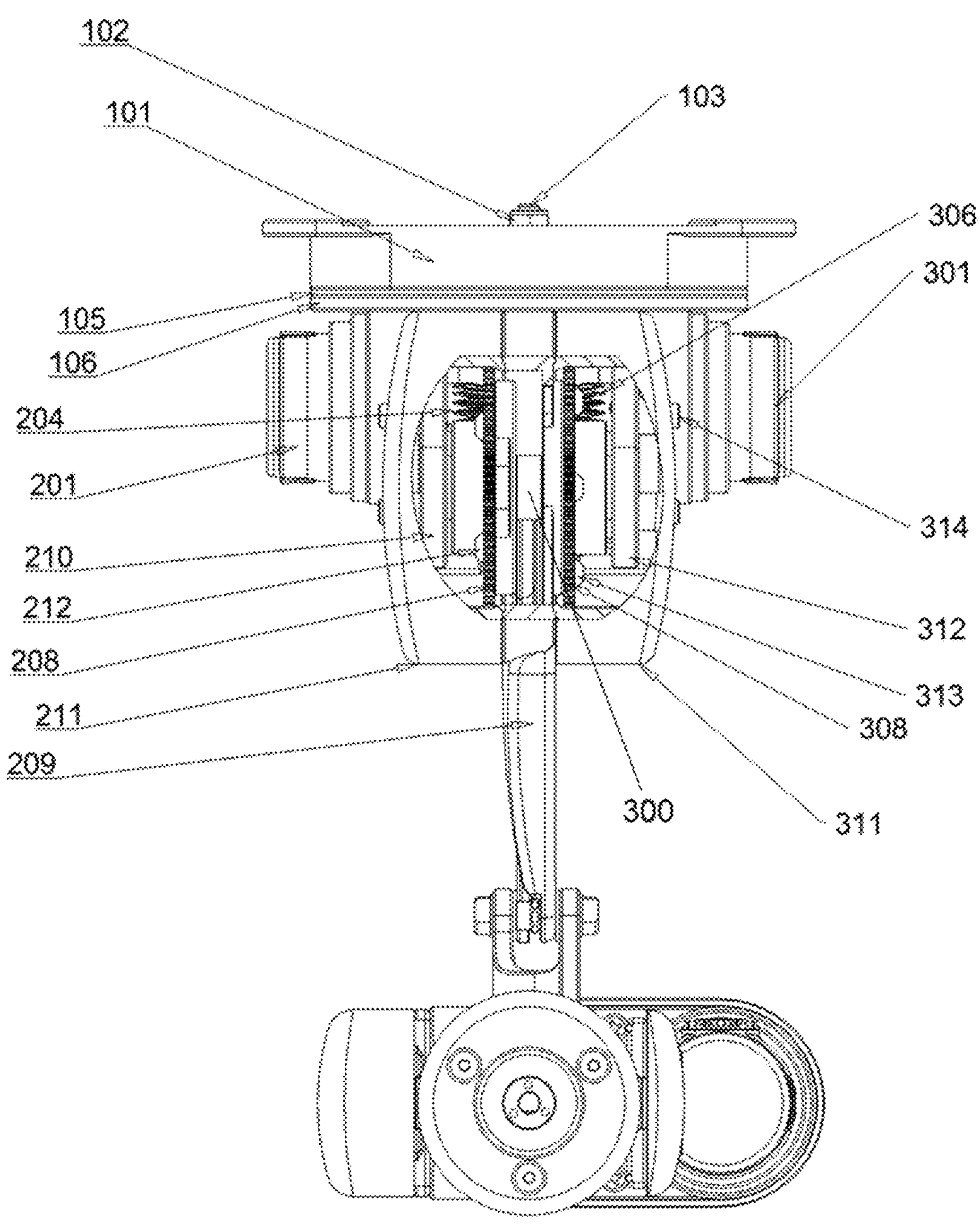
FIG. 9 is a perspective schematic diagram of a second and a third joints of a miniaturized mechanical arm provided by the present invention.
Figure 10:
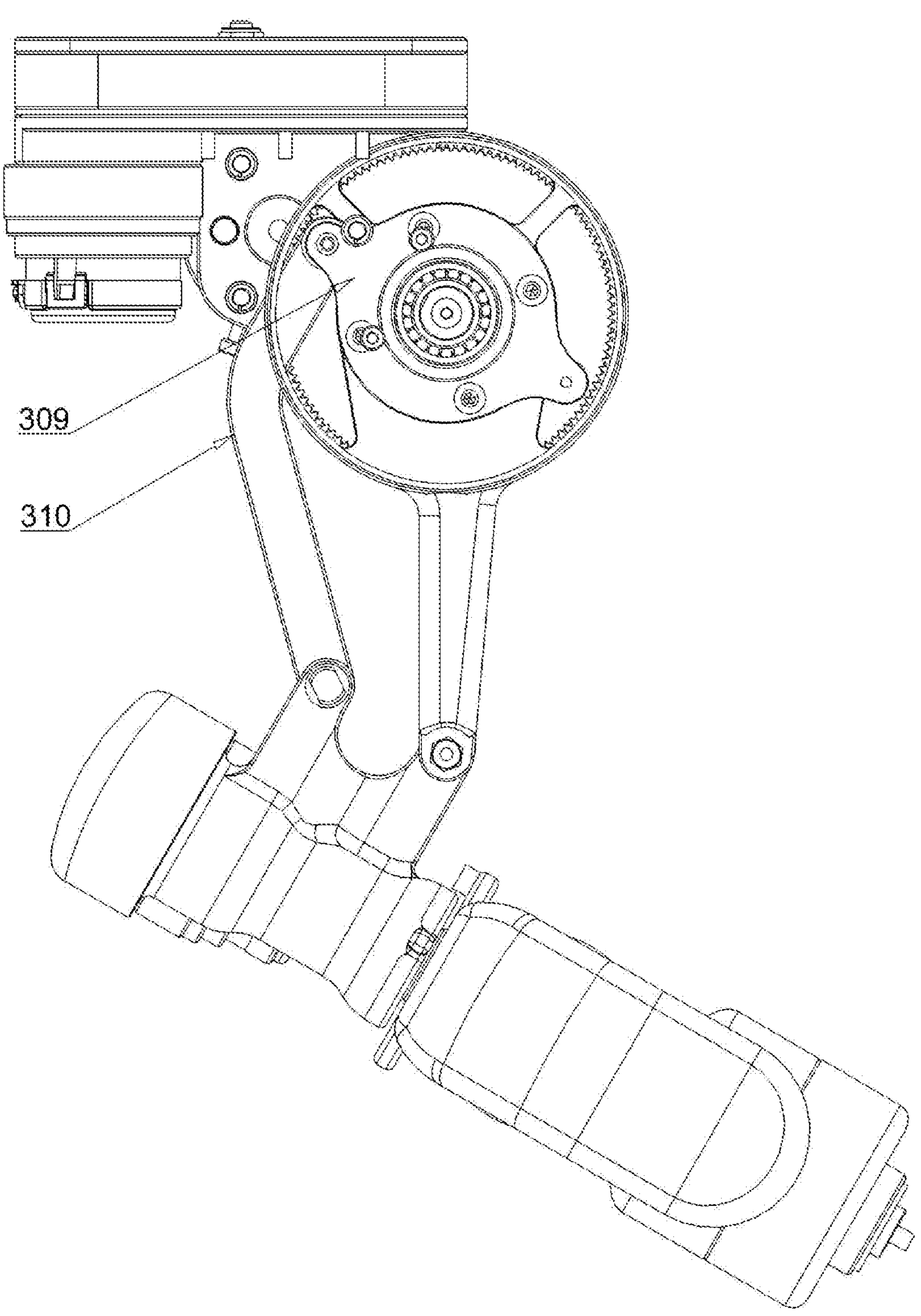
FIG. 10 is a perspective schematic diagram of a motion state of a third joint of a miniaturized mechanical arm provided by the present invention.
Figure 11:
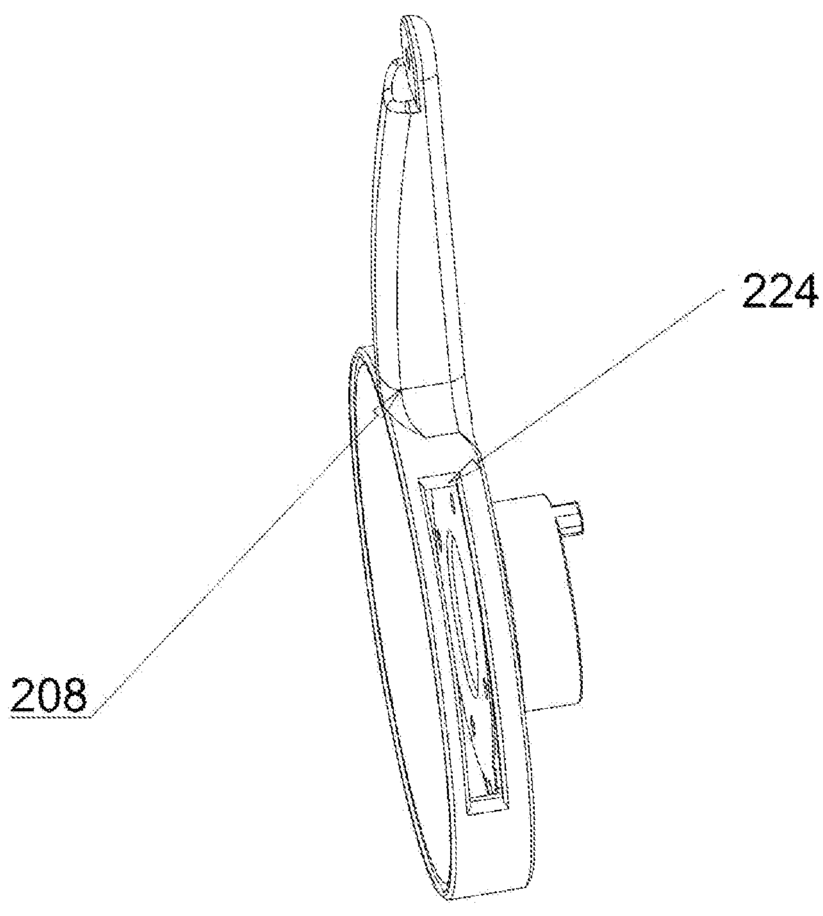
FIG. 11 is a schematic diagram of a large arm oscillating bar provided by the present invention.
Figure 12:
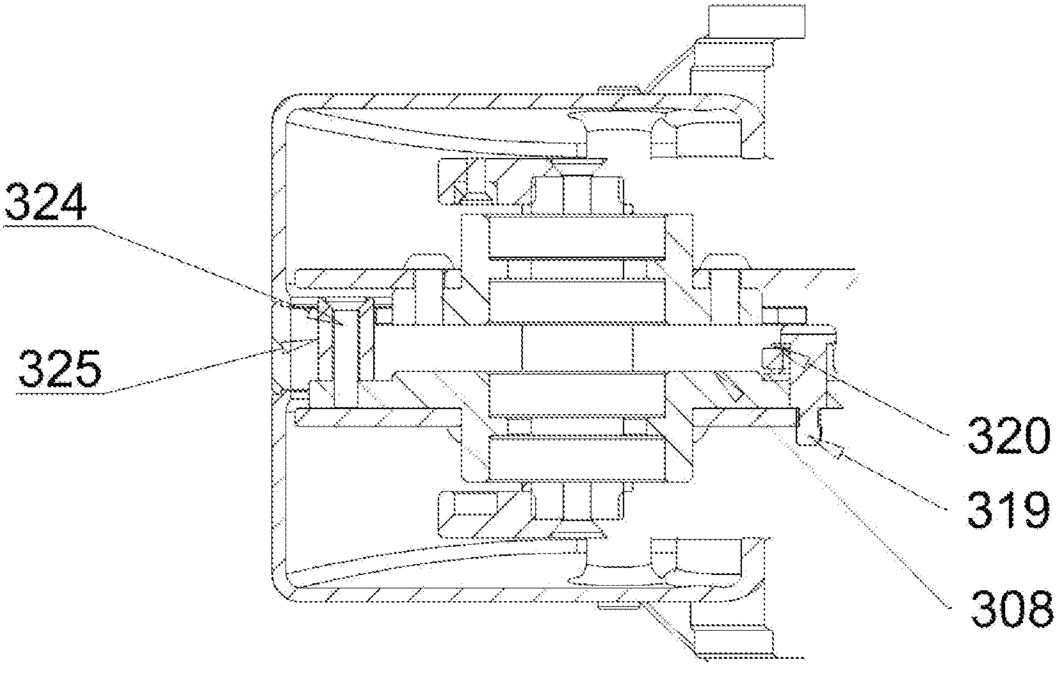
FIG. 12 is a schematic diagram of a limiting state of a third joint of a miniaturized mechanical arm provided by the present invention.

By referring to FIG. 7 to FIG. 8, for the specific structure of the first rotating body: a third motor 201 is coaxial with a second speed reducer 202, and the third motor 201 is connected to the first shell 311 through a tenth connecting screw 213 and a gasket 214. A fourth gear 204 and the second speed reducer 202 are tightly positioned and connected by screws, and fixedly connected with a second supporting wallboard 210 by the sixth connecting screw 218 and the third spring washer 219. The above belongs to positioning and connecting through straight ports. The fourth gear 204 is engaged and transmitted with a third transmission gear 205, a second duplex gear 206 and a fourth transmission gear 207 successively, and finally engaged with a fifth gear 208; the fifth gear 208 is connected with the large arm oscillating bar 209 through a seventh connecting screw 212, and positioned through a center shaft hole; The fifth gear 208 is a pore plate structure, and forms a limiting gap with the large arm oscillating bar 209, which is used as a mechanical limit for three-axis motion. The pore plate gear structure can not only reduce the weight of the body and the operating moment of inertia when the structural strength is determined, but also can be used as a mechanical limiting space to form a limiting space with a limiting pin shaft 325 for use. The limiting pin shaft 325 is a soft elastic material and fixed by an eighth connecting screw 324. The third connecting shaft 220 rotates coaxially with the large arm oscillating bar 209, is coaxially, mechanically and fixedly connected with the second encoder 203 and matched with the third motor 201, and finally outputs signals to form the double closed loop of structural signals. A second supporting wallboard 210 is provided with an arc long round hole, and the first limit 215 and the second limit 217 distributed on both sides are connected through the ninth connecting screw 216; and the limiting pin 223 is fixedly connected with the large arm oscillating bar 209, and moves in an arc space. An arc hole distance is the motion range of the two-axis large arm, and the limits on both sides are the soft elastic materials. The mechanical limit collision can protect the overall mechanical structure in use. The structure layout uses the internal space of the wallboard and the limiting pin layout to save the use space, increase structural compactness and improve structural stability.

The second motor 301 drives the first speed reducer 302 to transfer a speed torque to the second gear 303; the second gear 303 drives the first transmission gear 305; the first transmission gear 305 drives the first duplex gear 306; the first duplex gear 306 drives the second transmission gear 307; the second transmission gear 307 directly drives the third gear 308 to transfer the power to the turntable forearm

309; the turntable forearm 309 drives the forearm oscillating bar 310; the first encoder 304 and the turntable forearm 309 are coaxial output, and the first encoder 304 and the second motor 301 form a double closed loop.

The third motor 201 drives the second speed reducer 202 to transfer a speed torque to the fourth gear 204; the fourth gear 204 drives the third transmission gear 205; the third transmission gear 205 drives the second duplex gear 206; the second duplex gear 206 drives the fourth transmission gear 207; the fourth transmission gear 207 directly drives the fifth gear 208 to transfer the power to the large arm oscillating bar 209; the second encoder 203 and the large arm oscillating bar 209 are coaxial output, and the second encoder 203 and the third motor 201 form a double closed loop.

The internal structure of the installation housing forms symmetrical arrangement, which can simplify the overall structure and realize strong replaceability.

Figure 13:
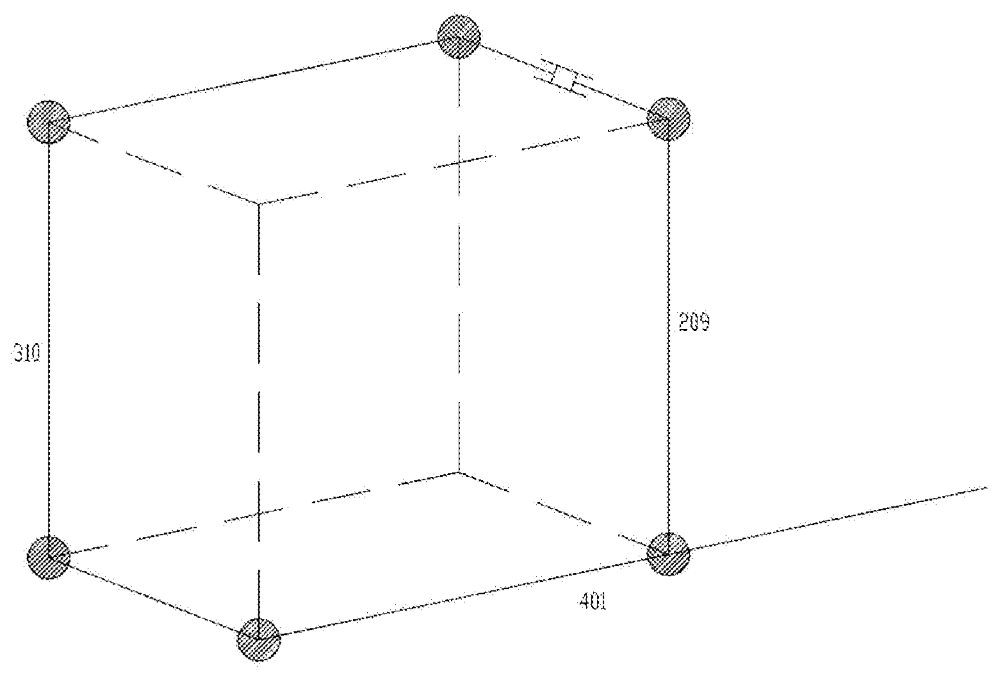
FIG. 13 is a schematic diagram of a spatial configuration of a second and a third joint connecting rods of a miniaturized mechanical arm provided by the present invention.

By referring to FIG. 13, biaxial, triaxial and coaxial motion does not interfere with each other. Biaxial motion drives the large arm oscillating bar 209 to swing. Triaxial motion is completed by two internal connecting rods, i.e., the turntable forearm 309, the forearm oscillating bar 310 and a shaft arm 401. The upper internal turntable forearm 309 and the shaft arm 401 are consistent in the motion state, and are two parallel sides of the spatial parallelogram, and the spatial quadrangle is staggered to enhance the structural stability; and the forearm oscillating bar 310 is bent, which mainly avoids the motion limitation and expands the motion range.

The forearm oscillating bar 310 should avoid the interference region of the large arm oscillating bar 209 and the turntable forearm 309 during motion. The slot space in the large arm oscillating bar 209 is an avoidance space, and the curved special shape of the oscillating bar should avoid the turntable forearm 309.

Figure 3:
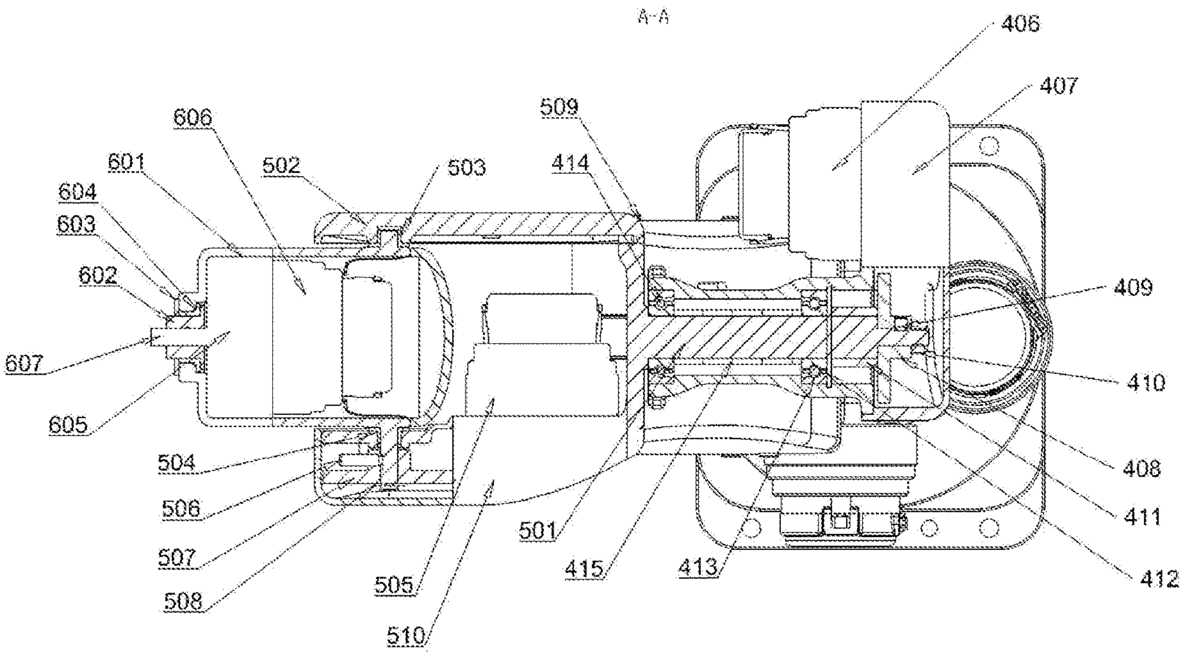
FIG. 3 is a schematic diagram of A-A in FIG. 2 provided by the present invention.
Figure 14:
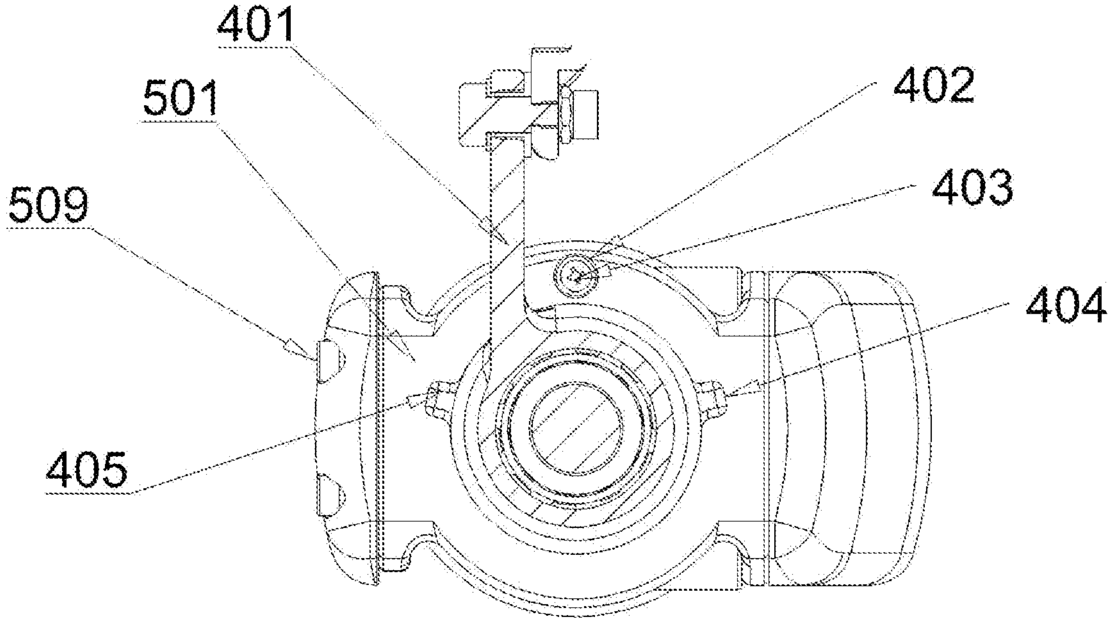
FIG. 14 is a schematic diagram of four-shaft limiting of a miniaturized mechanical arm provided by the present invention.
Figure 15:
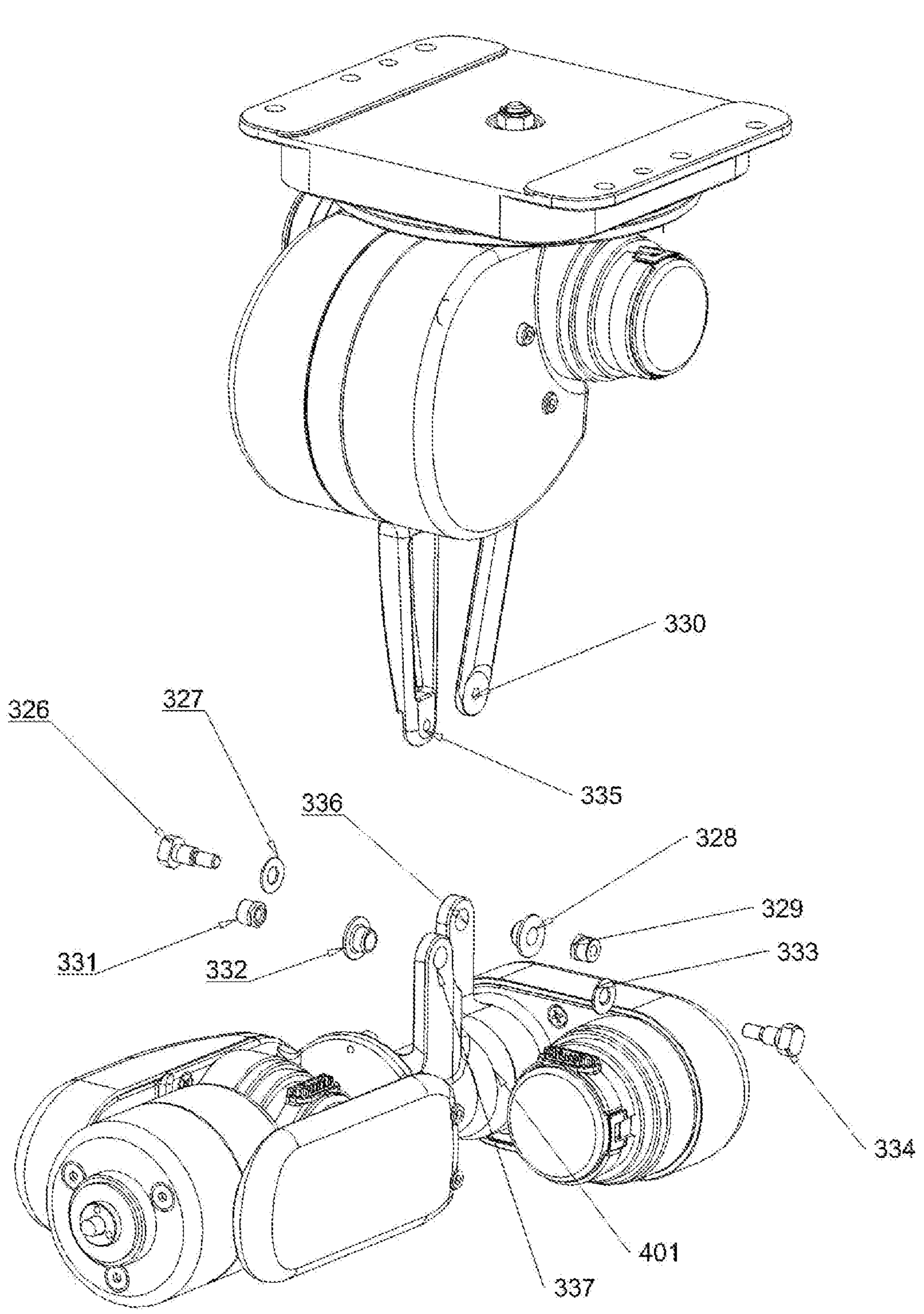
FIG. 15 is an explosive view of a connection relationship of a spatial parallelogram connecting rod structure and a triaxial mechanical arm provided by the present invention.

By referring to FIG. 3 and FIG. 14 to FIG. 15, the specific structure of the triaxial mechanical arm is:

The first connecting pin 326 is connected with the first sliding bearing 327 through an oscillating bar connecting hole 336 and an oscillating arm connecting hole 330, penetrates through the second thrust bearing 328 and is fixed and locked by the second locking nut 329; the second connecting pin 334 is connected with the second sliding bearing 333 through a first large arm connecting hole 337 and a second large arm connecting hole 335, penetrates through a third thrust bearing 332 and is fixed and locked by a third locking nut 331. The connection support of the spatial quadrangle is formed by two connections. It has structural interchangeability and increases the structural stability. The locking nut can adjust the starting torque of sliding friction, which can effectively play a certain brake.

A limiting shaft 402 is installed on the section of the second supporting shaft 501 through an eleventh connecting screw 403. Rotating motion exists between the second supporting shaft 501 and the shaft arm 401. The motion limit position is at the contact of the limiting shaft 402 with the third limit 405 and the fourth limit 404. The limiting shaft 402 is a soft elastomer.

The fourth motor 406 with the encoder is connected with a first speed reducer and drive transmission structure 407 and transmits power to the first output gear 408; and the first output gear 408 forms a whole with the second supporting shaft 501 through a set screw 409 and a fourth locking nut 410. The second supporting shaft 501 forms coaxial transmission with the shaft arm 401 through the second bearing 414 and the third bearing 413 to achieve four-axis rotation. A second spacer bush 415 in the middle adjusts the pre-tightening force of the bearing, and the bearing is positioned through a retaining ring for hole 412. The motor is arranged parallel to the shaft and installed in reverse to save the space. The overall center of gravity is reduced and a deceleration transmission structure can be arranged parallel to the first output gear 408.

The fifth motor 505 with the encoder is connected with a second speed reducer and drive transmission structure 510, and transmits a torque to the second output gear 507; and the second output gear 507 is connected with a supporting frame 601 through a limiting fixed shaft 506 to form power transmission. Five-axis rotation is realized. The fifth motor 505 is arranged in a rotation space without affecting the motion of other structural components, thereby achieving compact structure. A cover plate 502 on the other side is connected with the second supporting shaft 501 through the twelfth connecting screw 509, forms supporting structures on both sides to connect and fix the supporting frame 601 and achieves rotation with the fourth bearing 503 and the fifth bearing 504. The support on both sides can increase the supporting strength and avoid insufficient support of a cantilever shaft.

The motor 606 with the encoder is connected with a third speed reducer and drive transmission structure 605, and transmits the power to an output shaft 607; the output shaft 607 is fixedly connected with a connecting block 602; and an external device and apparatus are connected with the connecting block 602, and achieve sliding support through a sliding block 603. The connecting block 602 and the supporting frame 601 play a supporting role through the thrust bearing 604, and the rotation centers of the whole rear three axes intersect at one point, which can facilitate the structural decoupling and motion control of the robot.

In the present embodiment, the mechanical arm can be used in the narrow spaces of all kinds of medical imaging equipment, and can be used in the medical field, especially in CT and magnetic resonance equipment. If used in the magnetic resonance equipment, the rotating base, the triaxial mechanical arm and the spatial parallelogram connecting rod structure can be made of magnetic resonance compatible materials. The electrical part of the present invention is another patent for invention of the applicant with patent number CN202110652399.1 and the title of a magnetic resonance compatible robot system, which adopts a magnetic resonance compatible motor (such as an ultrasonic motor), encoders, shielding cables, etc.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A spatial parallelogram connecting rod structure, comprising:

an installation housing, wherein the installation housing is provided with a connecting rod moving notch; and a bidirectional rotating seat capable of performing coaxial and non-interfering bidirectional rotating is fixed inside the housing;

a first rotating body, wherein the first rotating body is rotatably connected to one side of the bidirectional rotating seat, and a rotating output end of the first rotating body is provided with a large arm oscillating bar extending from the moving notch;

a second rotating body, wherein the second rotating body is rotatably connected to another side of the bidirectional rotating seat; a rotating output end of the second rotating body is provided with a turntable forearm, an edge of the turntable forearm is hinged with a forearm oscillating bar, and the forearm oscillating bar extends from the moving notch;

an output control body, wherein the output control body is provided with two hinged points which are in the same direction, not coaxial and staggered; and the two hinged points are hinged with ends of the large arm oscillating bar and the forearm oscillating bar that extend from the installation housing respectively, wherein the first rotating body and the second rotating body realize input and transmission of rotating power through matching structures of motors and gear sets; central shafts of the rotating output ends of the first rotating body and the second rotating body are connected with two encoders fixed on both sides in the installation housing respectively; and the two encoders form a feedback closed loop with the two motors corresponding to both sides respectively, the second rotating body comprises a second motor, a first speed reducer, a second connecting shaft, a second gear, a first supporting wallboard, a first spring washer, a first transmission gear, a first duplex gear, a second transmission gear, and a third gear, wherein the second motor is coaxial with the first speed reducer, and the second connecting shaft is rotationally concentric with the turntable forearm, the second gear and the first speed reducer are tightly positioned and connected by screws, and fixedly connected with the first supporting wallboard by a first connecting screw, a third connecting screw and the first spring washer, the second gear is engaged with the first transmission gear, the first duplex gear and the second transmission gear successively, and finally engaged with the third gear, the third gear is fixedly connected with the turntable forearm through a second connecting screw, and the second connecting shaft is coaxially connected with a first encoder; and the first rotating body comprises a third motor, a second speed reducer, a third connecting shaft, a fourth gear, a second supporting wallboard, a third spring washer, a third transmission gear, a second duplex gear, a fourth transmission gear, and a fifth gear, wherein the third motor is coaxial with the second speed reducer, and the third connecting shaft is configured to rotate coaxially with the large arm oscillating bar, the fourth gear and the second speed reducer are tightly positioned and connected by screws, and fixedly connected with the second supporting wallboard by a sixth connecting screw and the third spring washer, the fourth gear is engaged with the third transmission gear, the second duplex gear and the fourth transmission gear successively, and finally engaged with the fifth gear, the fifth gear is connected with the large arm oscillating bar through a seventh connecting screw, and the third connecting shaft is coaxially, mechanically and fixedly connected with the second encoder and matched with the third motor.

2. The spatial parallelogram connecting rod structure according to claim 1, wherein both sides of the installation housing are provided with limiting grooves respectively on internal structures corresponding to the first rotating body and the second rotating body, and the first rotating body and the second rotating body are provided with limiting columns matched with the corresponding limiting grooves.

3. The spatial parallelogram connecting rod structure according to claim 1, wherein the forearm oscillating bar is a bent rod.

4. A miniaturized mechanical arm, comprising a rotating base, a triaxial mechanical arm and the spatial parallelogram connecting rod structure according to claim 1, wherein the installation housing is fixed on the rotating base, and the output control body is fixed on a shell of a first rotating mechanism of the triaxial mechanical arm.

5. The miniaturized mechanical arm according to claim 4, wherein the rotating base comprises a fixed part and a rotating part which are rotatably connected, and the rotating part is driven by the matching structures of the motors and the gear sets to rotate relative to the fixed part; a rotation stroke limiting structure is arranged between the fixed part and the rotating part; and the installation housing is fixed on the rotating part.

6. The miniaturized mechanical arm according to claim 5, wherein the triaxial mechanical arm comprises the first rotating mechanism, a second rotating mechanism and a third rotating mechanism which are connected successively; the first rotating mechanism, the second rotating mechanism and the third rotating mechanism are all motor driven output shaft rotating structures; a rotating output shaft of the first rotating mechanism is fixedly connected with the second rotating mechanism; a rotating output shaft of the second rotating mechanism is fixedly connected with the third rotating mechanism; and a rotating output shaft of the third rotating mechanism is a terminal working end.

7. The miniaturized mechanical arm according to claim 6, wherein a rotating plane of the first rotating mechanism is perpendicular to a rotating plane of the second rotating mechanism, and the rotating plane of the second rotating mechanism is perpendicular to a rotating plane of the third rotating mechanism.

8. The miniaturized mechanical arm according to claim 7, wherein a rotating plane of the first rotating body is parallel to a rotating plane of the second rotating body, and is perpendicular to a rotating plane of the rotating base and the rotating plane of the first rotating mechanism respectively; and the rotating plane of the rotating base is perpendicular to the rotating plane of the first rotating mechanism.

9. The miniaturized mechanical arm according to claim 4, wherein the fixed part of the rotating base is configured to be installed on a supporting apparatus of a medical device.

* * * * *